Patented July 18, 1939

2,166,179

UNITED STATES PATENT OFFICE 2,166,179

FILM MAINTAINING ELECTROLYTE

Samuel Ruben, New Rochelle, N. Y.

No Drawing. Application March 14, 1935,
Serial No. 11,076

14 Claims. (Cl. 175—315)

This invention relates to electrolytes for electrolytic condensers of the "dry" electrolytic type.

The general object of the invention is to provide an improved electrolyte for electrolytic condensers of the so-called dry type.

More specific objects of the invention are to provide an electrolyte of very low mobility, high conductivity, and non-corrosive properties which under continuous alternating current operation protects the electrode dielectric oxide films, preventing their disintegration and ultimate dissolution into the electrolyte, which has an inherent low resistance, which is homogeneous, free from crystallization, which is not adversely affected by the atmosphere, which is chemically and physically stable under all operating conditions, and which can be uniformly and economically produced.

A further object is to provide an electrolyte which allows the construction of an improved condenser of the type described, which does not require sealing, deforms slowly and re-forms rapidly, which may be operated throughout wide temperature ranges without excessive variations in electrical characteristics, which remains cool in operation and operates at a low power factor, which does not require expensive containers, and which in general may be said to enable the building of condensers more suitable for alternating current operation than condensers customarily used for such purpose at the present time.

A further object is the provision of an improved electrolyte for electrolytic condensers, lightning arrestors and the like.

The invention accordingly comprises the several steps and the relation of one or more of such steps with respect to each of the others, and the combination of elements and arrangements thereof which are adapted to effect such steps, all as exemplified in the following detailed disclosures, and the scope of the application of which will be indicated in the claims.

While a preferred embodiment of the invention is described herein, it is contemplated that considerable variations may be made without departing from the spirit of the invention.

In my Patent 1,918,717, I describe an electrolytic condenser comprising electrodes of film-forming material, at least one of which electrodes has a tacky, electrically conductive film-maintaining composition of a lacquer base material and a plasticizing component miscible therewith.

The electrolyte of the present invention is an improvement over the type described in that patent and enables the attainment to a higher degree of the objects of that patent.

The film maintaining composition or electrolyte of my present invention preferably comprises a conductive tree resin composition, for example, rosin which has been reacted or combined with an alkali such as sodium hydroxide, and which has been plasticized with a suitable agent such as ethylene glycol. The product resulting from the heating of these materials is a clear, brown, sticky material.

The electrolyte of this invention may be said to include the use of tree resin exudations, such as rosin, balsams, Venice turpentine, gum thus and other colophonic derivatives and other tree or vegetable resins, which are adapted directly or through the employment of an assisting agent, to dissolve into or react with alkalies. The tree resins being acidic in nature are neutralized by the alkalies and apparently form the salts of the respective resin acids. Other resins, of original vegetable origin, but which may have become hardened or fossilized, may be substituted for the colophonic type, provided they dissolve into or react with an alkali. To date, the rosins appear to be by far the most satisfactory of the vegetable origin resins.

All of the resins mentioned above are substantially water-insoluble and are to be distinguished from the water soluble plant gums, such as gum arabic, gum tragacanth, etc. However, when the reaction or combination is completed between the rosins and the alkalies, the product, if it is not actually soluble in water, is quite miscible therein.

Unlike the electrolyte described in my Patent 1,891,207 and similar electrolytes formed from ethylene glycol or glycerine and the boron compounds, the electrolyte of this invention does not require sealing, In operating an electrolytic condenser continuously on alternating current, I have found that there are several characteristics which are especially desirable, among which may be mentioned the following:

The electrolyte should preferably be immobile so as to prevent the disintegration and dissolution of the electrode dielectric film therein; it should be of a homogeneous character and of adequate specific resistance to provide uniform electrical conditions over the entire electrode surfaces. The immobility of the electrolyte should not be much reduced at the highest operating temperature of any section of the condenser.

It is also of considerable advantage in the operation of electrolytic condensers on alternating current to employ an electrolyte, the resistance of which is initially high but which at operating temperatures reduces so as to allow a better power factor and which, in combination with a suitable structure to provide adequate heat dissipation, will allow stable continuous operation. Such reduction in resistance should not, however, be accompanied by a large increase in the mobility of the electrolyte, as the electrolyte should remain in such form as to physically adhere to and protect the dielectric film. In condensers of the prior art, operated under conditions tending to bring about a considerable temperature rise, such as operation on continuous alternating current, a reduction in resistance occurs, but is usually accompanied by a phase change or settling out of particles, with resultant localized current effects. The electrolytes of this invention, examples of which are as follows, have been found capable of operating at high temperatures and on continuous alternating current, without flowing or separation, at the same time maintaining an adequate resistance and possess properties which otherwise meet the requirements of continuous service operation.

*Preferred formula*

28 grams of sodium hydroxide are dissolved in 800 c. c. of boiling water; 200 grams of rosin are added and the mixture held at boiling until all of the rosin is dissolved; 90 c. c. of ethylene glycol are added and the temperature raised to 120° C. at which point 100 grams of borax are added and dissolved into the boiling composition to form the complete electrolyte. If the borax is added at an earlier stage, it appears to form a water insoluble soap. Apparently, it is best added at about the point where the hydroxide has become neutralized.

*Other formulas*

(a) 23 grams of sodium hydroxide are dissolved in 500 c. c. of boiling water; 200 grams of rosin are added, the solution being kept at boiling and when the rosin is dissolved, 40 c. c. of ethylene glycol are added and the composition heated to 120° C.

(b) 200 grams of rosin and 500 c. c. of water are heated to boiling at which point 50 c. c. of ammonia (28% solution) are slowly added, the mixture being kept at the boiling point. 100 c. c. of ethylene glycol are added and the composition heated to 120° C.

In the above formulas, I have found that potassium hydroxide can be satisfactorily substituted for the sodium hydroxide and that the carbonates of potassium and sodium may be substituted for the hydroxide, although not as satisfactorily, as a longer time is required for the reaction and a considerable amount of carbon dioxide is evolved.

Ethylene glycol is the preferred plasticizer in the above formulas, although glycerine or triethenolamine may also be used, separately or in combination with the glycol. Where the rosin is first reacted with the sodium hydroxide or other alkali, glycol or glycerol borate may be used as a plasticizer.

Triethenolamine, being somewhat alkaline, may, for electrolytes of certain types, serve the combined function of an alkaline neutralizer for the acidic resin and plasticizer. In such cases the electrolyte would be composed merely of the resin and triethenolamine reacted together.

It will be seen that for the resin material, I prefer rosin, which in addition to having the property of readily reacting with the alkalies to form the desired film maintaining resin salt, is also abundant and cheap. The other colophonic materials such as gum thus and Venice turpentine are next in order of desirability and may be employed in substantially the same formulas as given. Other resins, when used, must be treated with reference to their acidity or acid content and ability to combine with the alkalies. In some cases, the reaction between the resin and the alkali may be facilitated by first dissolving the resin in the glycol or glycerine and then heating the alkali with the dissolved resin.

Rosin base resins, such as ester gums, or synthetic resins employing rosin as a base, and which have the property of combining with alkalies in a manner similar to that of rosin, may also be employed.

It has been found that the amount of alkali employed should be sufficient to neutralize the acidity of the rosin so as to form an alkali salt of the rosin which is neutral or preferably slightly acidic.

The ethylene glycol or other plasticizer serves to maintain the composition in a plastic tacky form and in the presence of borates allows a lower resistance for a given boiling point. The addition of the glycol or glycerol borates will increase the acidity of the composition.

The amount of glycol which is used preferably ranges between 25% and 50% of the combined weights of the resin and alkali. Electrolytes containing below 25% glycol are difficult to spread and handle while those containing more than 50% glycol flow too easily and especially in an open type condenser would have an impracticable cold flow point. For most applications, 30% to 40% glycol will be found satisfactory.

The water initially present when the electrolyte is prepared is driven off and it appears that no water is present in the completed electrolyte.

Dependent upon the temperature to which the electrolyte mixture is brought during its preparation, the resistance per cm.$^3$ may be varied over wide limits, as from 1500 ohms to 50,000 ohms, the particular service to which the condenser is to be applied being perhaps the most determining factor. Under conditions where a high operating temperature is to be encountered, a high initial resistance is desirable. This high initial resistance as well as the power factor, drops as the condenser reaches its equilibrium operating temperature. When lower operating temperatures are to be encountered, initially low resistance electrolytes may be used with improved condenser power factor.

When properly prepared, the electrolyte is a very viscous, plastic, varnish-like material and remains indefinitely in this condition, even though exposed to the atmosphere. Its consistency may be varied, of course, depending upon the proportions of ingredients and method of preparation particularly with respect to the temperature to which the composition is heated during its preparation. The electrolyte may be made in the form of a viscous liquid, which will slowly drip, or it may be made sufficiently immobile so that it will adhere to the electrodes without dripping or flowing. Preferably it may resemble a non-drying applied varnish. The immobility of the electrolyte serves to minimize the effect of any impurities which may be present in the resins. The electrolyte is preferably applied hot in the form of a tacky, electrically conductive film maintaining composition, which sticks to the current blocking film and tends to protect and maintain the film.

Due to the physical characteristics of my improved electrolyte, especially its non-flowing varnish-like form and its immunity from atmospheric attack, it is possible to build a condenser structure in which correct ventilation is obtained throughout the entire condenser. Such improved structures are shown in my co-pending application S. N. 10,288 filed March 9, 1935.

Also, due to the characteristics of the electrolyte, a condenser may be constructed in stack, roll, spaced or other form and mounted in any position without possibility of failure due to flowing of electrolyte when the condenser heats up, as has occurred when electrolytic condensers of the prior art have been operated on continuous alternating current service.

Since certain changes in carrying out the above process and in the constructions set forth, which embody the invention, may be made without departing from its scope, it is intended that all matter contained in the above dscription shall be interpreted as illustrative and not in a limiting sense.

What is claimed is:

1. An electrolytic condenser containing an electrolyte having a film-maintaining component comprising the reaction product of rosin and an alkali selected from the group consisting of sodium, potassium and ammonium hydroxide.

2. An elecrolytic condenser having an electrolyte comprising the reaction product of a tree resin, an alkali and a plasticizer.

3. An electrolytic condenser having an electrolyte comprising the reaction product of rosin, an alkali selected from the group consisting of sodium, potassium, ammonium hydroxide and a plasticizer.

4. An electrolytic condenser having an electrolyte comprising the reaction product of a tree an alkali and a viscous alcohol.

5. An electrolytic condenser comprising the reaction product of rosin, an alkali selected from the group consisting of sodium, potassium and ammonium hydroxide and an alcohol of the glycol type.

6. A film-maintaining electrolyte comprising the heat reaction product of the following ingredients in the approximate proportions indicated: sodium hydroxide 28 grams, water 800 c. c., rosin 200 grams, ethylene glycol 90 c. c. and borax 100 grams.

7. A film-maintaining electrolyte comprising the heat reaction product of the following ingredients in the approximate proportions indicated; sodium hydroxide 23 grams, water 500 c. c., rosin 200 grams, ethylene glycol 40 c. c.

8. A film-maintaining electrolyte comprising the heat reaction product of the following ingredients in the approximate proportions indicated; rosin 200 grams, water 500 c. c., 28% ammonia solution 50 c. c. and ethylene glycol 100 c. c.

9. The method of preparing a film-maintaining electrolyte composition which comprises dissolving sodium hydroxide in boiling water, adding rosin to the boiling mixture and boiling until all the rosin is dissolved, adding ethylene glycol and raising the temperature, and adding borax thereto.

10. The method of preparing a film-maintaining electrolyte composition which comprises dissolving approximately 28 grams of sodium hydroxide in 800 c. c. of boiling water, adding approximately 200 grams of rosin thereto and boiling the mixture until all of the rosin is dissolved, adding approximately 90 c. c. of ethylene glycol thereto and raising the temperature to approximately 120° C., and adding approximately 100 grams of borax to the boiling composition.

11. A dry electrolytic condenser comprising two electrodes, at least one of said electrodes being formed of film-forming metal, and an electrolyte comprising a vegetable resin, an alkali reacted therewith and in addition thereto a plasticizer.

12. A dry electrolytic condenser comprising two electrodes, at least one of said electrodes being formed of film-forming metal, and an electrolyte comprising a rosin, an alkali reacted therewith and in addition thereto a plasticizer.

13. A dry electrolytic condenser comprising two electrodes, at least one of asid electrodes being formed of film-forming metal, and an electrolyte comprising rosin and one of the materials glycol or glycerol borate.

14. A dry electrolytic condenser comprising two electrodes at least one of which has formed on its surface a current blocking oxide compound of the electrode material, an electrolyte in contact with said oxide layer and adapted to maintain the same comprising the product of a vegetable resin, a polyhydric alcohol and an alkali compound of one of the materials of the sodium-potassium-ammonium class.

SAMUEL RUBEN